United States Patent [19]
Müller

[11] 3,749,949
[45] July 31, 1973

[54] VARIABLE-SPEED ASYNCHRONOUS MOTOR WITH MULTIPLE ROTORS
[76] Inventor: Arnold Müller, Klosterstrasse 48, 7312 Kirchheim/Teck, Germany
[22] Filed: Aug. 4, 1972
[21] Appl. No.: 277,882

[30] Foreign Application Priority Data
Aug. 4, 1971 Germany............... P 21 38 898.7

[52] U.S. Cl.................. 310/59, 310/61, 310/62, 310/112, 310/114
[51] Int. Cl. ............................................. H02k 9/06
[58] Field of Search................ 310/52, 58, 59, 60 R, 310/61, 62, 63, 112, 114, 125

[56] References Cited
UNITED STATES PATENTS
3,209,184   9/1965   Woodward, Jr. ................. 310/59 X Primary Examiner—J. D. Miller
Assistant Examiner—H. Huberfeld
Attorney—Leo A. Rosetta, Arthur Schwartz et al.

[57] ABSTRACT

A variable-speed, multi-rotor asynchronous motor with a hollow cup-shaped intermediate rotor arranged adjacent the main rotor radially between the stator and an independently rotating ventilator rotor, where the intermediate rotor is removably and/or axially adjustably mounted on the main drive shaft. The rotors and the stator have air passages and air lobes for the internal cross-circulation of air; the bearing plates have openings for the entry and exit of cooling air from the ventilator.

12 Claims, 3 Drawing Figures

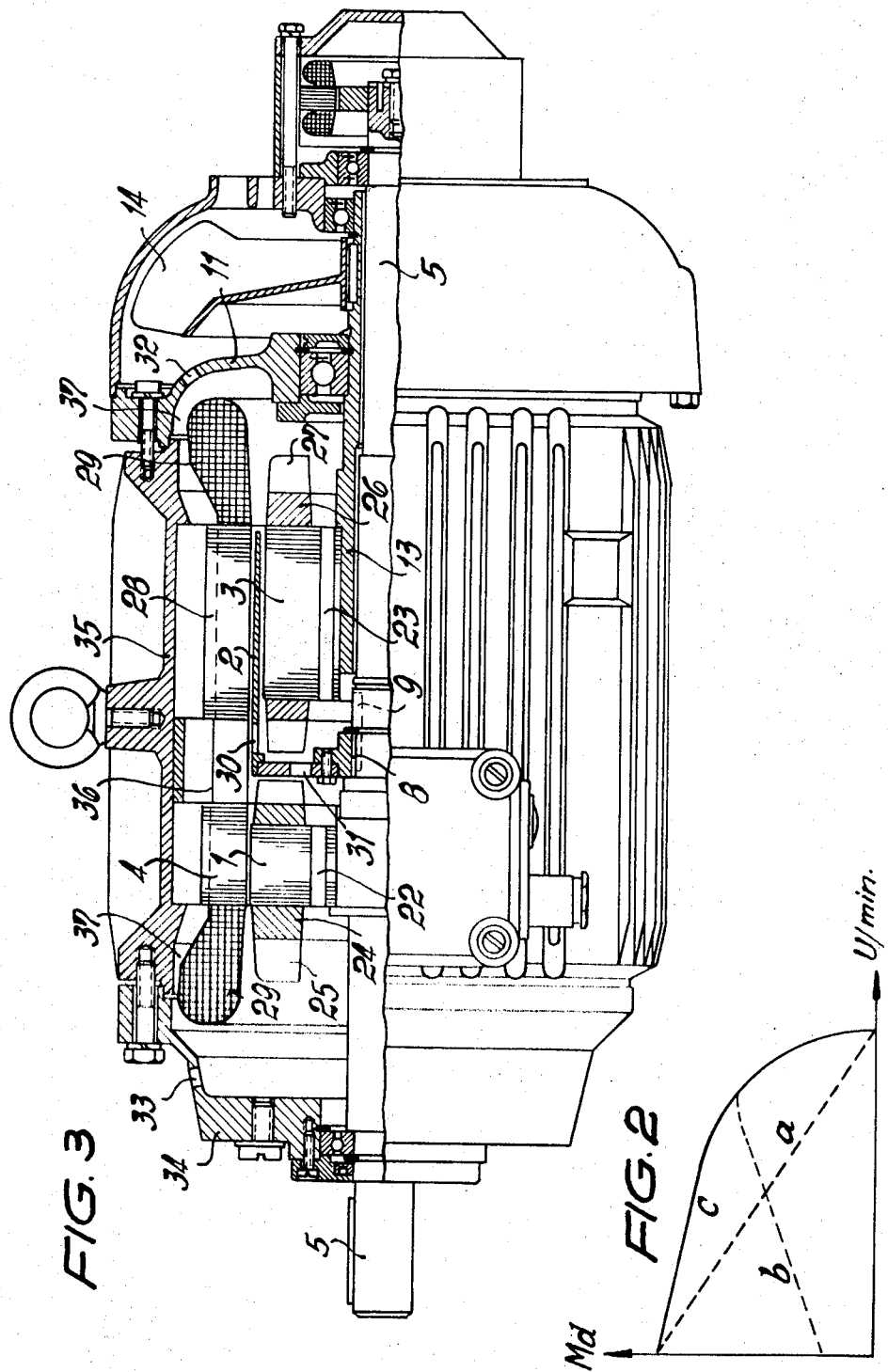

3,749,949

VARIABLE-SPEED ASYNCHRONOUS MOTOR WITH MULTIPLE ROTORS

BACKGROUND OF THE INVENTION

1. Field of the Invention

The present invention relates to variable-speed asynchronous motors, and in particular to variable-speed asynchronous motors which have independently rotating rotors cooperating with a common stator.

2. Description of the Prior Art

The prior art in the field of variable-speed asynchronous induction motors includes known solutions to the problems of speed and torque control which suggest a multiple rotor system cooperating with a common stator. Such a rotor system may include a hollow-cylindrical intermediate rotor which is mounted solidary with the drive shaft of the motor and a ventilation rotor arranged inside the hollow intermediate rotor for rotation independently of the latter at a practically unchanged speed. The intermediate rotor in this case also forms a functional component of the squirrel-cage type main rotor.

SUMMARY OF THE INVENTION

It is an objective of the present invention to provide an improved variable-speed asynchronous motor of the multiple-rotor type whose improvements relate to simplifications in the manufacture and assembly of such motors, as well as to their electrical efficiency. A further objective of the present invention is to provide a possibility of adapting the effective iron length of the main rotor and ventilator rotor, and consequently also of the intermediate rotor to different operating requirements which require a change in performance characteristics.

The invention proposes to attain the above objectives by suggesting a mounting arrangement for the intermediate rotor in which the latter is detachable from its seat on the drive shaft which carries the main rotor, thereby permitting the axial repositioning of the intermediate rotor in order to change the performance characteristics of the rotor assembly. This arrangement permits a modification of the output characteristics without the need for changing the drive elements of the motor. To achieve this result, it is for example possible to mount the intermediate rotor on the drive shaft by means of a key-and-keyway, the keyway in the drive shaft being longer than the hub of the intermediate rotor so that the latter can be shifted axially and retained in different positions by simple retaining rings. This arrangement affords the possibility of changing the effective iron length between the stator and the main rotor, including the possibility of using a shorter or longer intermediate rotor and ventilator rotor.

In order to provide a continuous speed control for this type of asynchronous motor, it is also suggested to connect a tachometer-generator to one end of the drive shaft. This tachometer-generator indicates the actual motor speed and feeds this information to the potentiometer of an electronic control unit which has been set to a desired speed value, the control unit automatically adjusting the motor speed to the desired value by means of a phase-shifting voltage regulator. This phase-shifting voltage regulator is a voltage control device which operates by offsetting the sine wave of the alternating voltage into two half waves, thereby changing the effective voltage. Such a control device for the speed regulation of asynchronous motors is known as such.

Another advantageous development of the invention relates to the structural design of the rotating parts of the rotor system, aimed at an optimal air circulation through the motor without the need for costly additional components. It provides a flow of ventilating air through the motor independent of the speed of the drive shaft and of the motor load. For this purpose, the rotor system is so arranged that the yokes of the main rotor and of the ventilator rotor have axially oriented air passages and the short-circuiting end rings of the ventilator rotor and of the main rotor carry ventilating lobes which improve the air circulation inside the rotor system itself.

A preferred embodiment of the invention further suggests that the winding package of the stator is provided with radial air passages and the intermediate rotor has radial as well as axial holes to further improve the air circulation inside the motor housing. The circulation of cooling air is further enhanced by providing air passages through both bearing plates of the motor, thereby permitting air to be forced into and through the motor by the ventilator wheel which is driven by the ventilator rotor.

The invention as suggested thus provides an asynchronous motor with a multiple rotor system of simplified and improved design which affords economies of manufacture and assembly and which has an improved adaptability to different electrical operating requirements. It also offers improved ventilation cooling of the motor under any kind of load without increasing the cost of the motor.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 2 represents a graph of the performance characteristics of the motor of FIG. 1; and FIG. 3 shows in another partial longitudinal cross section similar to that of FIG. 1 a second embodiment of the invention with improved air circulation features.

DESCRIPTION OF THE PREFERRED EMBODIMENT

Figure 1:
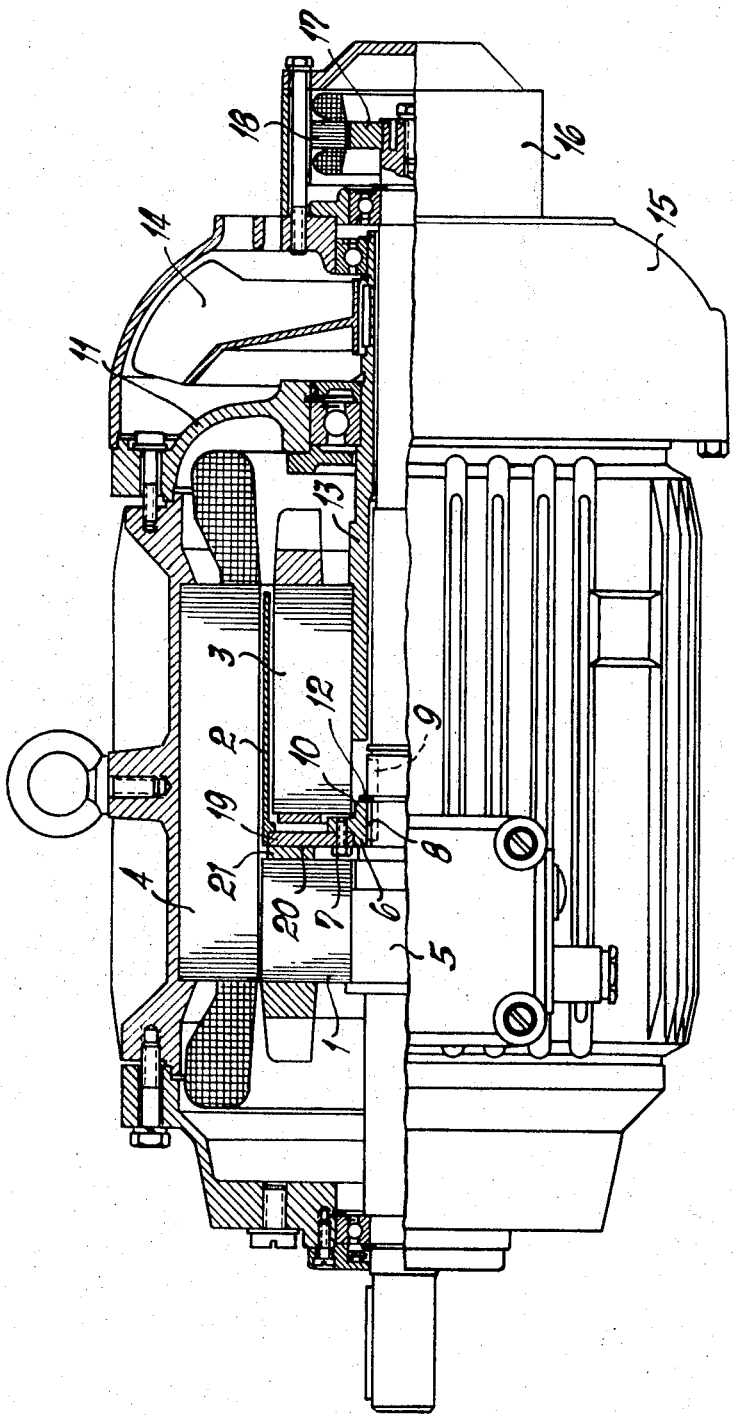
FIG. 1 shows in a partial longitudinal cross section a multi-rotor asynchronous motor embodying the invention.

FIGS. 1 and 2 show a main rotor 1 fixedly mounted on the motor drive shaft 5 and axially adjacent thereto an intermediate rotor 2 in the form of a hollow-cylindrical cup. Inside the intermediate rotor 2 is arranged a ventilator rotor 3, and the three rotors are surrounded by a common stator 4. Whereas the main rotor 1 is permanently mounted on shaft 5, the intermediate rotor 2 includes a mounting flange 6 by which it is removably mounted to drive shaft 5. The mounting means in this case may be bolts 7 or any other suitable detachable mounting arrangement. Flange 6 is provided with a keyway 8 cooperating with a matching keyway 9 in shaft 5 which is axially longer than the hub 10 of mounting flange 6. A key connects the mounting flange 6 to the shaft 5. This mounting arrangement offers the possibility of replacing a given intermediate rotor 2 and ventilator rotor 3 by shorter rotors and/or mounting them in an axially shifted position closer to the bearing plate 11 of the motor assembly. This also permits the use of a main rotor 1 of increased iron length. The axial position of flange 6 on shaft 5 is determined by means of a retaining ring 12 mounted on drive shaft 5. Other positioning means may likewise be suitable.

One possible alternative to the above mounting arrangement would be to directly attach the intermediate rotor 2 to the flange plate 20 of main rotor 1. A further possibility would be to extend the intermediate rotor 2 as far as the short-circuiting end ring 21 of main rotor 1 and to assemble these two parts into a solidary unit.

The ventilator rotor 3 is carried by a hollow ventilator shaft 13 which surrounds the drive shaft 5 without being connected thereto. Shaft 13 is rotatably supported by bearings arranged in bearing plate 11 and in the end cover 15, respectively. The ventilator shaft 13 carries between these two bearings a ventilator wheel 14 which thus derives its rotation from the ventilator rotor 3 independently of the rotation of drive shaft 5 and main rotor 1. The end cover 15 carries on its axial end face a housing 16 for a tachometer-generator. Drive shaft 5 extends through the ventilator shaft 13 into the tachometer-generator housing 16, carrying a tachometer rotor 17 on its extremity which cooperates with the generator winding 18 mounted inside housing 16.

The outer end face 19 of intermediate rotor 2 may be positioned at an axial distance from the oppositely arranged flange plate 20 of the short-circuiting end ring 21 of rotor 1, or it may be directly abutting against the latter as shown in FIG. 1.

Drive shaft 5 thus directly carries a portion of the iron length in the form of the conventional main rotor 1 whose longitudinal grooves are filled with a material of high conductivity. The short-circuiting end ring which is arranged either directly on the rotor end face or on the intermediate rotor 2 is made of non-magnetic conductive material or, as the case may be, of a combination of non-magnetic and magnetic material of high electrical conductivity. The intermediate rotor 2 being likewise mountable on drive shaft 5, these two rotors together produce the variable torque at the desired speed. The ventilator rotor 3 which rotates inside the intermediate rotor 2 is in the form of a conventional short-circuited rotor which rotates independently of drive shaft 5 at a constant speed, driving the ventilator wheel 14 by means of the hollow shaft 13 on which the ventilator rotor and ventilator wheel are mounted. The ventilator rotor 3 further serves as a feedback element for the intermediate rotor 2 regardless of the varying speed of main rotor 1 and intermediate rotor 2 on their common drive shaft 5.

The earlier-described combination of varying torques (Md) and their interdependence with varying speeds (U/min) is indicated in the graph of FIG. 2. The short-circuited main rotor 1 has an output characteristic corresponding to line b (dotted line) which reaches its maximum torque at its maximum speed, as is usually the case with such rotors. The intermediate rotor 2 has an output characteristic indicated by line a, likewise represented by an approximately straight dotted line. Its torque is smallest at its maximum speed. A combination of the characteristics of main rotor 1 and intermediate rotor 2 therefore produces an output characteristic according to line c, representing the sum of the output values a and b. Line c thus represents a far better variable speed characteristic than either of lines a and b taken separately. The torque of this combination is still approximately 70 percent of the maximum torque value when the rotors have almost reached their synchronous rate. The power factor cos $\phi$ (not shown in the graph) remains at the favorable value of approximately 0.8 over the entire speed range.

In order to obtain optimal cooling for this kind of variable-speed asynchronous motor, the invention suggests as illustrated in FIG. 3, several modifications of the earlier-described embodiment of FIG. 1. This cooling means must provide reliable cooling and ventilation in all operating conditions of the motor. The modified embodiment therefore suggests the arrangement of a series of axial bores 22 across the yoke of main rotor 1 and a similar series of axial bores 23 across the ventilator rotor 3 carried by shaft 13. It further suggests the addition of ventilator lobes 25 on the outside of short-circuiting end ring 24 of main rotor 1 and similar ventilator libes 27 on the outside of short-circuiting end ring 26 of ventilator rotor 3. These elements ensure a good air circulation across and around main rotor 1 and ventilator rotor 3 by forcibly circulating the air inside the motor.

An additional modification suggests radial passages 30 in the tubular portion of intermediate rotor 2 in approximate axial alignment with the inner short-circuiting end ring of ventilator rotor 3. The flange blade carrying the intermediate rotor 2 has an additional series of axial bores 31 to further improve the internal air circulation.

The air circulation can be still further improved by providing radial passages 36 across the stator assembly 4 opposite the inner short-circuiting end rings of mainn rotor 1 and ventilator rotor 3. These radial passages 36 communicate with axial channels 28 which are formed by flattened portions on the periphery of the stator assembly 4. An annular gap 37 between the windings 29 of stator 4 and the inner wall of housing 35 completes the succession of air passages so as to allow continuous free circulation of air across the heat generating parts of the motor.

A substantial improvement of the overall air circulation can be obtained by providing an additional series of passages or bores 32 across bearing plate 11 on the ventilator side and similar passages 33 across the end bearing plate 34 on the drive side of the motor. The air flow from ventilator wheel 14 now not only passes along the outside of housing 35, but a portion of it is forced inside the motor and axially across the several rotors. This two-way air flow is maintained at full force regardless of the speed of the motor.

What is claimed is:

1. A variable-speed multi-rotor asynchronous motor comprising:
   a housing assembly with a stator mounted therein;
   a drive shaft rotatably supported in the housing assembly;
   a variable-speed main rotor fixedly mounted on the drive shaft and cooperating with the stator to represent a first portion of the total effective iron length;

a hollow, cup-shaped intermediate rotor arranged axially beside the main rotor but inside the stator for rotation with the main rotor and drive shaft;

a hollow ventilator shaft surrounding a portion of the drive shaft beside the main rotor and being supported for rotation independent of the drive shaft;

a ventilator rotor arranged inside the cavity of the intermediate rotor and fixedly mounted on the ventilator shaft so as to cooperate with the stator across the wall of the intermediate rotor to form another portion of the effective iron length, the ventilator rotor rotating asynchronously at a substantially constant speed independently of the main rotor; and a ventilator wheel mounted on the ventilator shaft.

2. A motor as defined in claim 1, further comprising: means for connecting the intermediate rotor to the drive shaft and main rotor in such a way that its axial position relative to the main rotor can be adjusted.

3. A motor as defined in claim 2, wherein:

the connecting means includes a flanged hub supporting the intermediate rotor, an entrainment means between the hub and the drive shaft which allows the hub to be shifted axially on the drive shaft, and a removable positioning means determining the axial position of the flanged hub on the drive shaft.

4. A motor as defined in claim 3, wherein:

the entrainment means is in the form of a key-and-keyway connection, the keyway in the drive shaft extending axially beyond the flanged hub to permit repositioning of the latter.

5. A motor as defined in claim 2, wherein:

the main rotor is a squirrel-cage type rotor with short-circuiting end rings on its axial end faces; and the connecting means is so arranged that the intermediate rotor is mounted directly adjoining one of said short-circuiting end rings.

6. A motor as defined in claim 5, wherein:

the connecting means is so arranged that the intermediate rotor is removably fastened to the adjoining short-circuiting end ring of the main rotor.

7. A motor as defined in claim 5, wherein:

the connecting means is so arranged that the intermediate rotor and the adjoining short-circuiting end ring of the main rotor are integral portions of a common member.

8. A motor as defined in claim 1, further comprising:

means for circulating cooling air between and across the several rotors.

9. A motor as defined in claim 8, wherein:

the air circulating means includes a series of axial air passages across the body of the main rotor and another series of axial air passages across the body of the ventilator rotor; and both the main rotor and the ventilator rotor include short-circuiting end rings with protruding lobes for the creation of air circulation inside the motor.

10. A motor as defined in claim 9, wherein:

the intermediate rotor includes connecting means in the form of a flanged hub supporting it on the main shaft; and the air circulating means further includes a series of axial air passages across said flanged hub.

11. A motor as defined in claim 9, wherein:

the air circulating means further includes radial air passages in the stator body in approximate axial alignment between the main rotor and the ventilator rotor, axial air passages between the stator and the housing assembly in communication with the radial air passages, and radial air passages across the wall of the intermediate rotor in approximate axial alignment with the radial air passages of the stator.

12. A motor as defined in claim 8, wherein:

the housing assembly includes a bearing plate between the ventilator rotor and the ventilator wheel, an open ventilator hood on the outside of the ventilator wheel, and a bearing cover on the opposite side of the stator; and the air circulation means includes a series of air passages across the bearing plate and another series of air passages across the bearing cover, thereby allowing a portion of the air flow from the ventilator wheel to enter and traverse the inside of the motor.

* * * * *